(12) United States Patent
Enquist et al.

(10) Patent No.: US 11,009,422 B2
(45) Date of Patent: May 18, 2021

(54) VACUUM BELL PROBE AND METHOD FOR LEAK DETECTION

(71) Applicant: INFICON Holding AG, Bad Ragaz (CH)

(72) Inventors: Fredrik Enquist, Linkoping (SE); Henrik Vennerberg, Linkoping (SE)

(73) Assignee: INFICON HOLDING AG, Bad Ragaz (CH)

( * ) Notice: Subject to any disclaimer, the term of this patent is extended or adjusted under 35 U.S.C. 154(b) by 180 days.

(21) Appl. No.: 15/999,471

(22) PCT Filed: Feb. 13, 2017

(86) PCT No.: PCT/EP2017/053161
§ 371 (c)(1),
(2) Date: Aug. 17, 2018

(87) PCT Pub. No.: WO2017/140624
PCT Pub. Date: Aug. 24, 2017

(65) Prior Publication Data
US 2019/0346332 A1    Nov. 14, 2019

(30) Foreign Application Priority Data
Feb. 17, 2016   (EP) .................................... 16156046

(51) Int. Cl.
*G01M 3/04*           (2006.01)
(52) U.S. Cl.
CPC ..................... *G01M 3/04* (2013.01)

(58) Field of Classification Search
CPC .......... G01M 3/04; G01M 3/205; G01M 3/22; G01M 3/28
See application file for complete search history.

(56) References Cited

U.S. PATENT DOCUMENTS

| 3,502,439 A | 3/1970 | Reece et al. |
| 4,745,641 A | 5/1988 | Tash |
| 6,357,280 B1 | 3/2002 | Hu et al. |
| 6,817,227 B2 * | 11/2004 | Thompson ............ G01M 3/205 73/40.7 |
| 2010/0049122 A1 * | 2/2010 | Jaeger-Waldau ..... A61M 1/007 604/74 |

(Continued)

FOREIGN PATENT DOCUMENTS

| CA | 2029063 A1 | 5/1992 |
| CN | 1323391 A | 11/2001 |

(Continued)

OTHER PUBLICATIONS

Machine translation of DE 3528622 (Year: 1987).*

*Primary Examiner* — Natalie Huls
(74) *Attorney, Agent, or Firm* — The Webb Law Firm

(57) ABSTRACT

A vacuum bell probe for detecting leaks in underground gas pipes may include a flexible suction cup having a bottom side forming a suction opening. The suction cup may define an interior volume. The bottom side may include a soft seal ring having a higher elasticity than the suction cup, surrounding the suction opening and forming a contact surface adapted to create a seal in contact with a ground surface under which a gas leak may be assumed such that a vacuum may be generated within the interior volume upon contact to the ground surface.

12 Claims, 3 Drawing Sheets

(56) References Cited

U.S. PATENT DOCUMENTS

| | | | |
|---|---|---|---|
| 2010/0326169 A1 | 12/2010 | Grosse-Bley et al. | |
| 2011/0219855 A1* | 9/2011 | Lucente | G01M 3/22 |
| | | | 73/40.7 |
| 2017/0205307 A1* | 7/2017 | Hogreve | G01M 3/227 |
| 2017/0276565 A1* | 9/2017 | Enquist | G01M 3/22 |

FOREIGN PATENT DOCUMENTS

| | | | |
|---|---|---|---|
| DE | 3528622 A1 * | 2/1987 | G01M 3/20 |
| DE | 4127543 A1 * | 2/1993 | G01N 33/0009 |
| DE | 4411928 A1 | 1/1995 | |
| DE | 4418774 A1 | 11/1995 | |
| DE | 102008008262 A1 | 8/2009 | |
| GB | 1127699 A * | 9/1968 | G01M 3/20 |
| JP | 60-188829 A | 9/1985 | |
| WO | 8804774 A1 | 6/1988 | |
| WO | WO-2019180373 A1 * | 9/2019 | G01M 3/225 |

\* cited by examiner

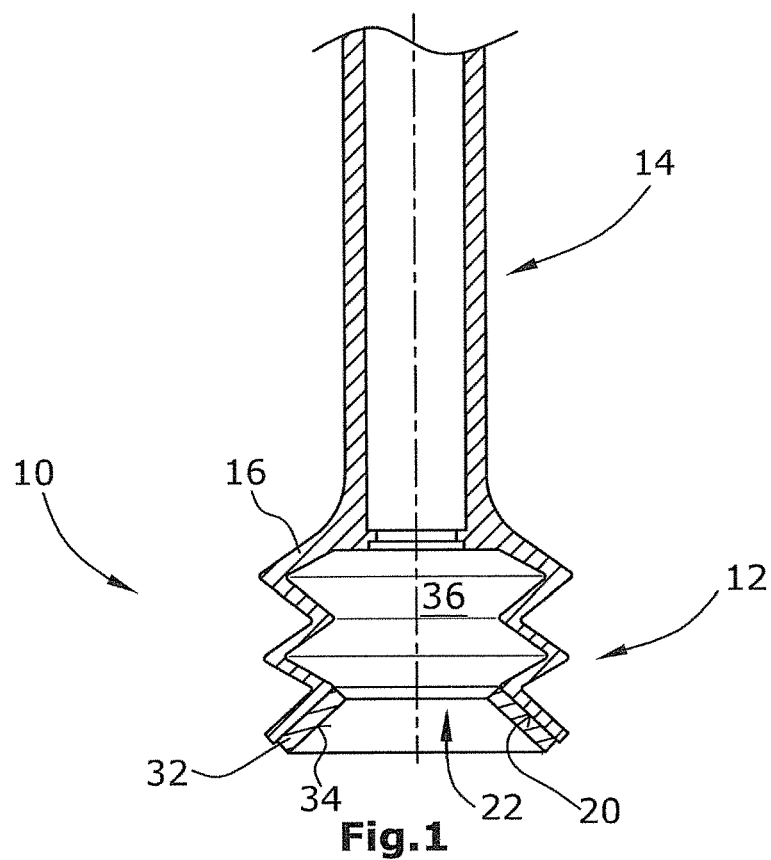
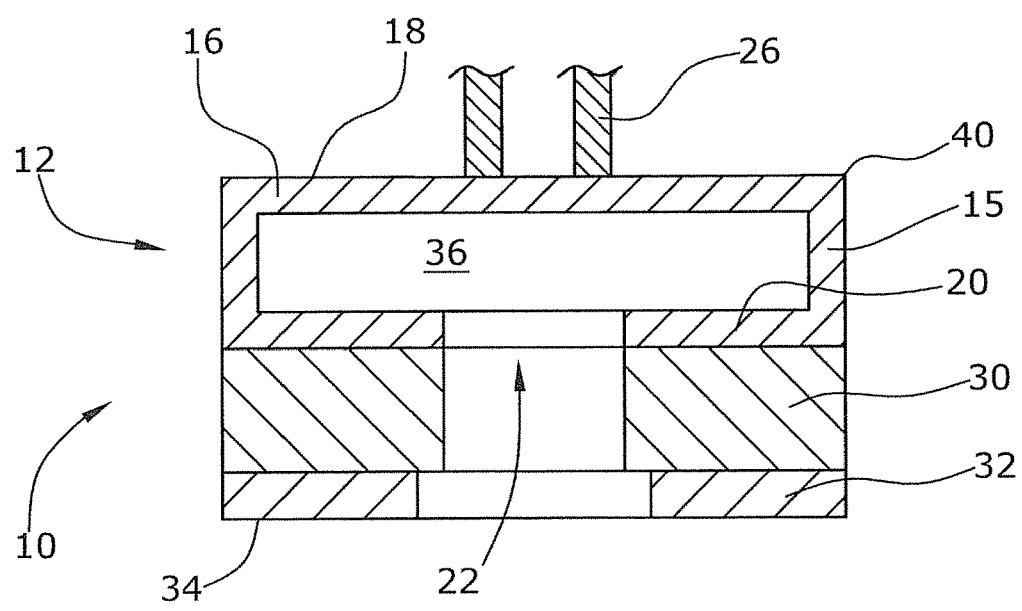

VACUUM BELL PROBE AND METHOD FOR LEAK DETECTION

CROSS-REFERENCE TO RELATED APPLICATIONS

This application is the United States national phase of International Application No. PCT/EP2017/053161 filed Feb. 13, 2017, and claims priority to European Patent Application No. 16156046.1 filed Feb. 17, 2016, the disclosures of which are hereby incorporated in their entirety by reference.

BACKGROUND OF THE INVENTION

Field of the Invention

The invention refers to a vacuum bell probe and method for detecting leaks in underground gas pipes.

Description of Related Art

Gas will escape through a leak in an underground pipe and can be detected at the ground surface with the probe. Vacuum bell probes are known, which comprise a vacuum bell housing with an open bottom, which is pressed against the ground surface above the assumed leak. A particular force needs to be applied to the vacuum bell in order to form a sufficient seal between the bell housing and a ground surface typically made of concrete or asphalt, in order to be able to create a vacuum within the bell housing. The vacuum bell housing is connected to a vacuum pump in order to evacuate the bell housing when its suction opening is sufficiently sealed.

The prior art vacuum bell probes already comprise elongated handles for carrying and moving the probe and for placing it against the ground surface by an operator. The required force for sufficiently sealing the probe against the ground surface needs to be applied by the operator.

It is further known to detect gas escaping from an underground gas pipe by placing a bellow type probe on the ground surface at a specific location below which a gas leak is assumed. The probe comprises a suction cup in the form of a bellow at the lower end of an elongated handle carried by the operator. A probe of this type is for example the 8612 surface probe of INFICON AB, Sweden. This probe generates a vacuum in the range of 100-200 millibar below atmospheric pressure in order to collect gas within the suction cup and convey the gas to the gas sensor. The probe is not able to generate a vacuum pressure which would be sufficient to draw gas from below a ground surface and through an asphalt or concrete surface.

SUMMARY OF THE INVENTION

It is an object of the invention to provide an improved vacuum bell probe for leak detection in underground pipes.

Accordingly, the vacuum bell probe comprises a flexible suction cup surrounding an interior volume and having a bottom side comprising a suction opening. The suction opening is surrounded by a seal ring, the elasticity of which is higher than the elasticity of the suction cup. The seal ring defines a contact surface for contacting a ground surface below which a leak in an underground pipe is assumed.

The invention is based on the idea of drawing natural gas, such as methane, through a hard ground surface, such as asphalt or concrete paving. This is achieved by establishing a sufficiently low vacuum. This achieves the major advantage that drilling of holes into the ground surface, as required by the prior art methods is not necessary. Drawing gas directly through a hard ground surface was not achieved in the prior art methods for detecting leaks in underground pipes.

The seal ring may be formed of a compression ring connected to the suction cup and a soft seal ring connected to the compression ring. The elasticity of the soft seal ring is higher than the elasticity of the compression ring. Most preferably, the soft seal ring and/or the compression ring are flat and cylindrical. The compression ring is attached to the bottom surface or the lower ring of the sidewall of the suction cup.

The suction cup is pressed onto the ground surface such that the elastic seal ring contacts the ground surface creating a seal. A vacuum pump connected to the interior volume of the suction cup is used to generate a vacuum within the interior at or below 200 milibar below atmospheric pressure. The soft suction cup allows to adapt to larger structures while the elastic seal ring adapts to smaller structures such as small stones or dirt, such that a sufficiently tight seal is achieved in order to draw gas from below the ground surface through the ground surface into the interior volume of the suction cup. Upon generating the vacuum within the suction cup, the suction cup collapses like a bellow and the gas escaping from a leak in an underground pipe is drawn through the ground surface and through the suction cup to the gas sensor connected to the suction cup.

The gas detector is connected at a distance to the vacuum bell probe and, preferably, carried by an elongated handle carrying the suction cup at its lower end. The handle may also carry at least one vacuum pump for generating the vacuum pressure.

The gas flow path connecting the vacuum bell probe, the vacuum pump and the gas detector may comprise an exhaust outlet open to atmosphere. Moreover, a reference gas inlet and a switching valve may be located in the gas flow path between the vacuum pump and the gas detector. The switching valve may be adapted to alternatingly connect either the vacuum bell probe and the exhaust outlet to the gas detector, or the reference gas inlet to the gas detector, depending on the switching state of the switching valve.

The vacuum bell probe may comprise a yoke forming at least one stepping portion onto which the operator may place a foot in order to press the suction cup against the ground surface.

According to an embodiment, the handle comprises a spring which allows to tilt the handle portion above the spring with regard to the bell housing without damaging the handle. Preferably, the handle comprises, or is entirely made of, a carbon fiber material. Stepping onto a stepping surface in order to apply a sufficiently large force to the bell housing while holding on to the handle will not break the handle due to the spring. The spring can be a pull spring which may be cylindrical.

The handle may be hollow in order to form or comprise a gas tube connected to the suction opening. The gas drawn through the suction opening may then be guided through the handle to the sensor for analysis or detection.

The invention may also be directed to a gas leak detection system comprising a vacuum bell probe of the invention and as described above, as well as at least one gas detector and a vacuum pump. The vacuum pump is located in the gas flow path between the vacuum bell probe and the gas detector in order to pull the gas through the vacuum bell probe and to convey the gas to the gas detector. In particular, the vacuum pump is powerful enough to pull gas through asphalt or concrete surfaces on which the vacuum bell probe is placed.

Preferably, the connecting conduit connecting the vacuum pump and the at least one gas detector comprises or is connected, to an exhaust outlet to open atmosphere. Moreover, the gas leak detection system may comprise a reference gas inlet and a switching valve which alternatingly switches between two switching states. One switching state connects the reference gas inlet to the gas detector. The other switching state connects the vacuum bell probe, the vacuum pump or the vacuum bell probe, the vacuum pump and the exhaust outlet, respectively, to the gas detector. In this embodiment, the exhaust outlet may be connected to the connecting conduit between the vacuum pump and the switching valve. When the switching valve is in the switching state connecting the reference gas inlet to the gas detector, the vacuum pump conveys the gas sucked into the vacuum bell probe through the exhaust outlet to open atmosphere. This has the advantage, that the vacuum pump may continue its operation, when the switching valve connects the reference gas inlet to the gas detector, thereby closing the gas flow path from the probe and the vacuum pump to the gas detector.

BRIEF DESCRIPTION OF THE DRAWINGS

In the following, an embodiment of the invention is described with reference to the figures.

FIG. 1 shows a first embodiment of the vacuum bell probe,

FIG. 2 shows a second embodiment of the vacuum bell probe,

DESCRIPTION OF THE INVENTION

Figure 3:
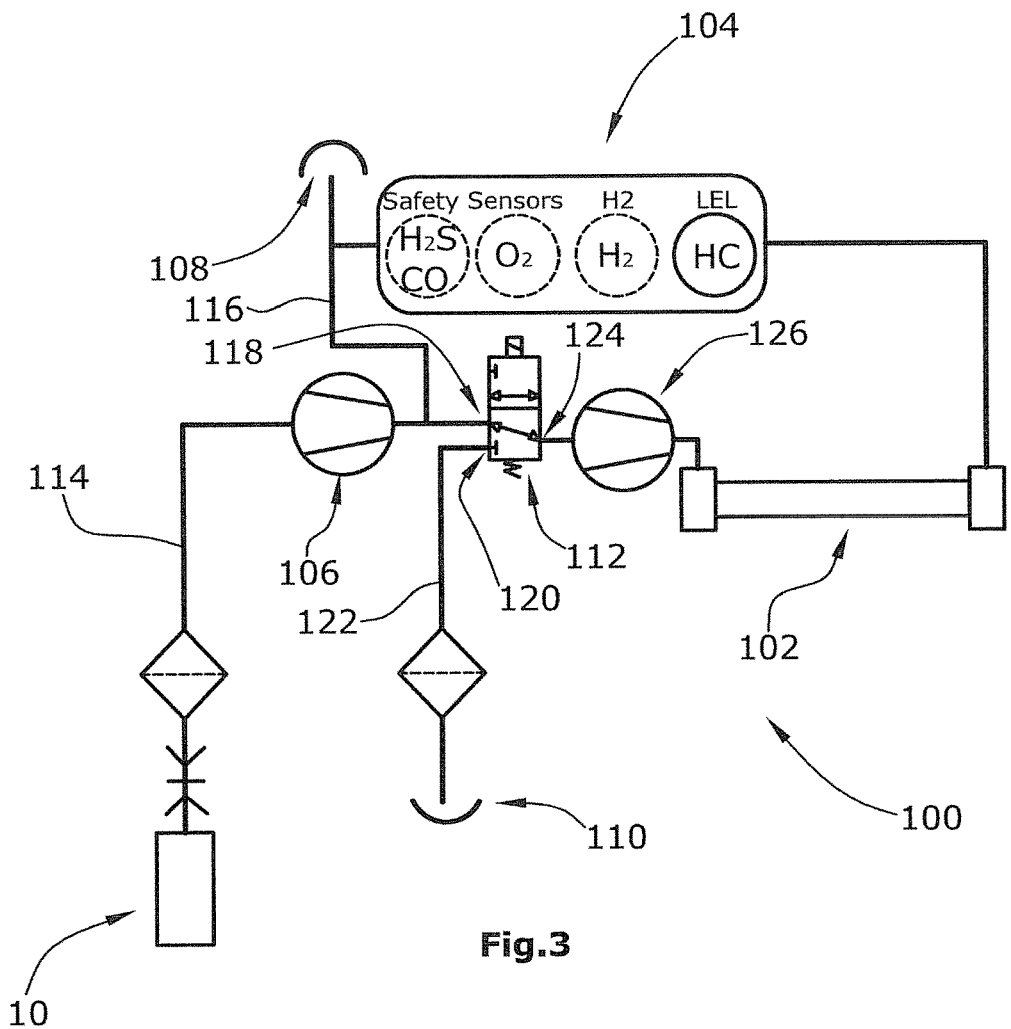
FIG. 3 schematically shows the layout of the gas leak detection system.

FIG. 1 shows the vacuum bell probe 10 according to a first embodiment comprising an elongated vertical handle 14. At the lower end of the handle 14, a suction cup 12 is connected which forms a flexible bellow surrounding an interior volume 36 of the suction cup 12. An upper portion 16 of the suction cup 12 is connected to the handle 14. A bottom side 20 of the suction cup 12 opposite to its upper portion 16 defines a suction opening 22 and comprises a soft seal ring 32. The elasticity of the seal ring 32 is higher than the elasticity of the suction cup 12. When pressed onto a ground surface, such as an asphalt pavement, the seal ring 32 contacts the ground surface in a manner which allows to generate a vacuum pressure lower than at least 200 millibar below surrounding atmospheric pressure.

Gas escaping from a leak in an underground pipe below the ground surface is thereby drawn through the ground surface and through the suction opening 22 into the interior volume 36, and from there through the hollow handle 14 to the gas detector 102, 104.

FIG. 2 shows the second embodiment, in which the suction cup 12 is flat and cylindrical and the elongated handle 14 extends upwardly there from.

The suction cup 12 comprises a lateral side wall 15, a closed upper wall 16 forming a stepping surface 18 on its upper side and an open bottom wall 20 forming a suction opening 22.

A pull spring not shown in the FIGS. is provided between an upper handle portion and a lower portion 26 of the handle 14. This allows tilting of the two handle portions with regard to each other and, thus, tilting of the upper handle portion relative to the suction cup 12. When an operator steps onto the stepping surface 18 while holding on to the upper handle portion, the suction cup 12 may tilt with respect to the upper handle portion. Breaking or damage of the handle 14 is thereby avoided.

As shown in FIG. 2, cylindrical solid rubber compression ring 30 may be attached to the bottom side 20 of the bell housing while a soft seal ring 32 of closed cell expanded rubber is attached to the solid compression ring 30 opposite to the bell housing 12. The lower portion 34 of the soft seal ring 32 forms a contact surface for airtight contact to a ground surface under which a gas leak is assumed.

Figure 4:
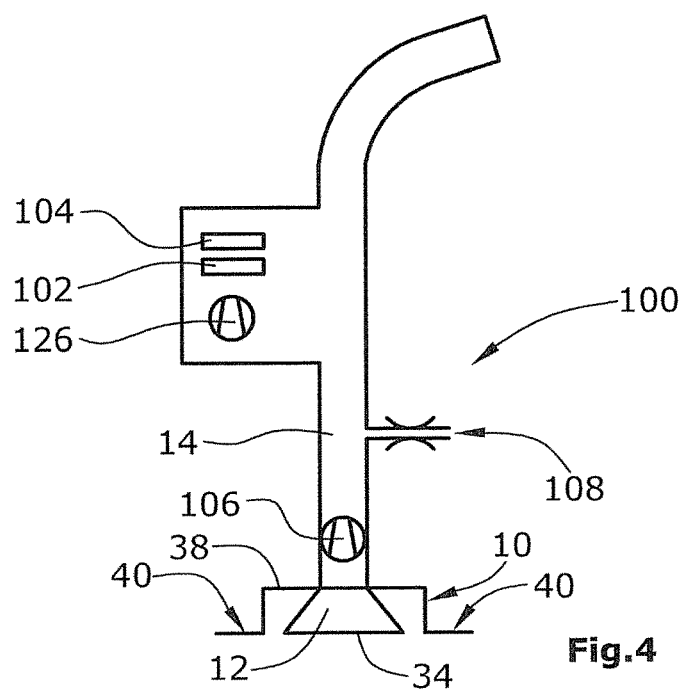
FIG. 4 shows a schematic illustration of the gas leak detection system.

The handle 14 is hollow, forming a tube connected to the interior 36 of the bell housing 12 such that gas which is drawn into the interior 36 through the suction opening 22 is guided through the handle 14 to a gas sensor 102, 104 which may be connected to an upper end of the handle 14, as shown in FIG. 4

FIG. 3 shows how the vacuum bell probe according to FIGS. 1 and 2 is integrated into the gas leak detection system 100. The vacuum bell probe 10 is connected to a switching valve 112 via a sample gas conduit 114. The sample gas conduit 114 comprises a vacuum pump 106 located in the gas flow path between the vacuum bell probe 10 and the switching valve 112. The portion of the sample gas conduit 114 connecting the vacuum pump 106 and the switching valve 112 is connected to an exhaust outlet 108 via an inlet conduit 116, thereby connecting the sample gas conduit 114 to open atmosphere.

The sample gas conduit 114 is connected to a first inlet 118 of the switching valve 112. A second inlet 120 of the switching valve 112 is connected to a reference gas inlet 110 via a reference gas conduit 122.

The switching valve 112 further comprises an outlet 124 connected via a sample pump 126 to first and second gas detectors 102, 104.

The switching valve 112 comprises two switching states. In the first switching state, it connects the first inlet 118 to the outlet 124, thereby connecting the gas detectors 102, 104 to the vacuum bell probe 10 via the sample gas conduit 114 and the vacuum pump 106. In its second switching state, the switching valve 112 connects the second inlet 120 to the outlet 124, thereby connecting the reference gas inlet 110 to the gas detectors 102, 104 via the reference gas conduit 122 and the sample pump 126.

In the second switching state, the sample gas conduit 114 is shut off by the switching valve 112. The vacuum pump 106 then conveys against a closed first inlet 118 of the switching valve 112. However, the exhaust outlet 108 and the inlet conduit 116 allow for an unchanged operation of the vacuum pump 106.

Moreover, locating the suction opening 22 to create a seal on a ground surface (such as asphalt or concrete) results in a considerable pressure drop in the sample gas conduit 114 and the flow can decrease to be even lower than that of the sample pump 126. In this case there is no sensor signal until the suction bell is lifted and air is drawn into the suction opening 22 and transports the accumulated gas to the sensor. To avoid this intermittent signal response, a permanent sample gas flow is achieved by getting extra flow through the exhaust outlet 108 and the inlet conduit 116. As the signals achieved from the vacuum bell probe 10 are usually fairly high, respective dilution of the sample gas through the exhaust is not a problem.

Figure 5:
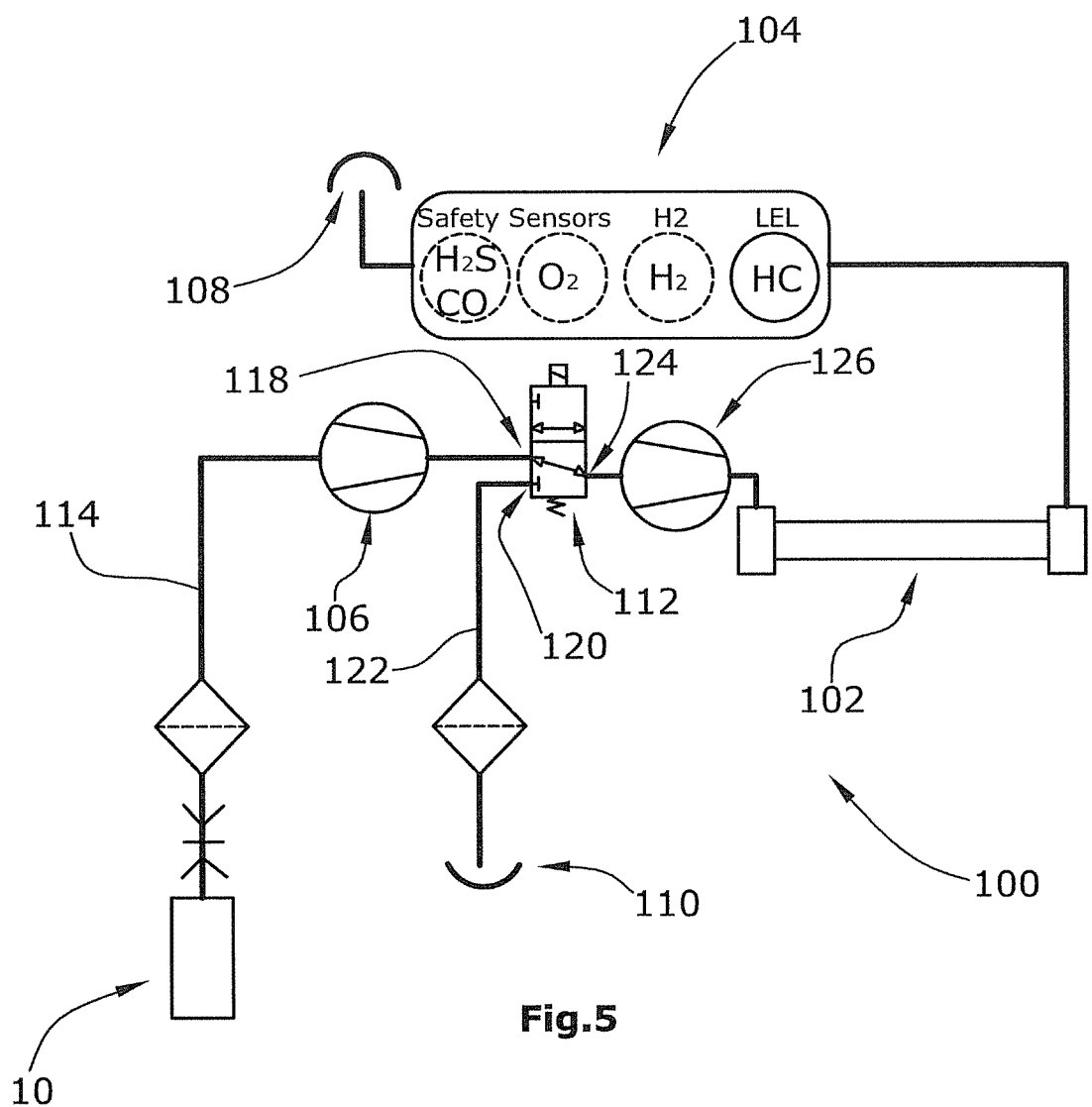
FIG. 5 shows the layout according to FIG. 3 of a further embodiment.

It would also be possible to move the valve down close to the main pump (which in turn is close to the vacuum bell) and avoid inlet 108 as shown in FIG. 5. The example in FIG.

5 mainly corresponds to the example in FIG. 3. The only difference is that the exhaust outlet 108 is not connected to the inlet 118 of the switching valve 112 because conduit 116 is missing. The closer the pump is to the bell and the smaller the bell volume the shorter the response time.

The speed/concentration loss balance can then additionally be controlled by the duty cycle of the valve 112. The speed/concentration loss balance can be trimmed by selecting or adjusting the following parameters:

Restriction in inlet 108

Speed of sample pump 126.

In other words, the configuration of the two pumps 106 and 126 allows to draw a vacuum through an asphalt surface via the vacuum bell probe 10 on the one hand, and constant sample flow to the detectors 102, 104 via the sample pump 126 on the other hand.

FIG. 4 shows a schematic external view of the gas leak detection system 100. The suction cup 12 is covered by a yoke 38 having a stepped configuration, thereby defining stepping surfaces 40 on opposite sides of the suction cup 12. An operator may place a foot on each stepping surface 40 to thereby press the suction cup 12 against the ground surface.

A compression plug, which is not shown in the FIGS., may be provided to be pushed into the suction opening 22 to thereby seal off the suction opening 22. The compression plug may have a gas conduit and may be adapted to fix the suction cup 12 to a hole, for example by screw engagement.

The invention claimed is:

1. A vacuum bell probe adapted to be used in combination with a gas leak detector for detecting leaks in underground gas pipes, the vacuum bell probe comprising:
   a flexible suction cup having a bottom side forming a suction opening, the suction cup defining an interior volume and forming a bellow being compressible by vacuum pressure within the interior volume,
   wherein
   the bottom side comprises a soft seal ring having a higher elasticity than the suction cup, surrounding the suction opening and forming a contact surface adapted to create a seal in contact with a ground surface under which a gas leak is assumed such that a vacuum is generated within the interior volume upon contact to the ground surface, the soft seal ring being flat and cylindrical and attached to the bottom side of the suction cup.

2. The vacuum bell probe according to claim 1, wherein the soft seal ring is formed of closed cell expanded rubber.

3. The vacuum bell probe according to claim 1, wherein the suction cup is formed of solid rubber.

4. The vacuum bell probe according to claim 1, wherein the bottom side comprises a compression ring surrounding the suction opening, whereon the seal ring is attached.

5. The vacuum bell probe according to claim 1, further comprising an elongated handle connected to an upper portion of the suction cup opposite to the bottom side, the handle being hollow and forming or comprising a gas tube connected to the interior volume.

6. A gas leak detection system comprising a vacuum bell probe according to claim 1, at least one gas detector connected at a distance to the vacuum bell probe, and at least one vacuum pump within a gas flow path connecting the vacuum bell probe and the gas detector.

7. The gas leak detection system according to claim 6, further comprising an exhaust outlet open to atmosphere within the gas flow path between the vacuum pump and the gas detector.

8. The gas leak detection system according to claim 6, further comprising a reference gas inlet and a switching valve located in the gas flow path between the vacuum pump and the gas detector, such that the switching valve alternatingly connects either the vacuum bell probe and the exhaust outlet to the gas detector, or connects the reference gas inlet to the gas detector depending on the switching state of the switching valve.

9. A method for detecting leaks in underground gas pipes employing the vacuum bell probe according to claim 1, comprising:
   locating the vacuum bell probe on a ground surface under which a gas leak is assumed, such that the contact surface contacts the ground surface; and
   generating a vacuum pressure within the interior volume below atmospheric pressure by operating a vacuum pump connected to the interior volume to thereby draw gas up through the ground surface into the interior volume and to a gas detector connected to the interior volume.

10. The method according to claim 9, wherein the vacuum generated within the interior volume is around or below 200 millibar below atmospheric pressure.

11. The method according to claim 10, wherein the achievable pV-throughput is above 0.7 N liter/minute.

12. The method according to claim 9, wherein the vacuum is around or below 400 millibar below atmospheric pressure.

* * * * *